April 3, 1951     K. J. DE JUHASZ     2,547,377
CHECK VALVE DEVICE
Filed Dec. 19, 1944     2 Sheets-Sheet 1
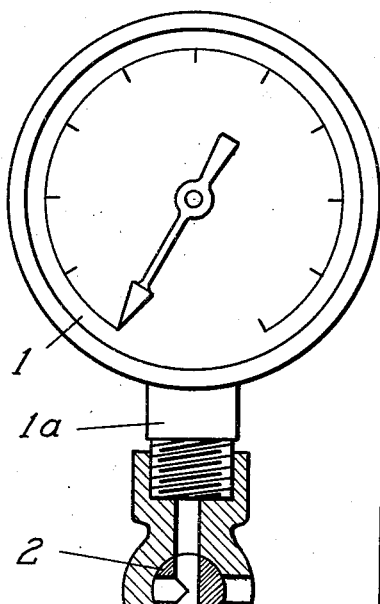
Fig. 1
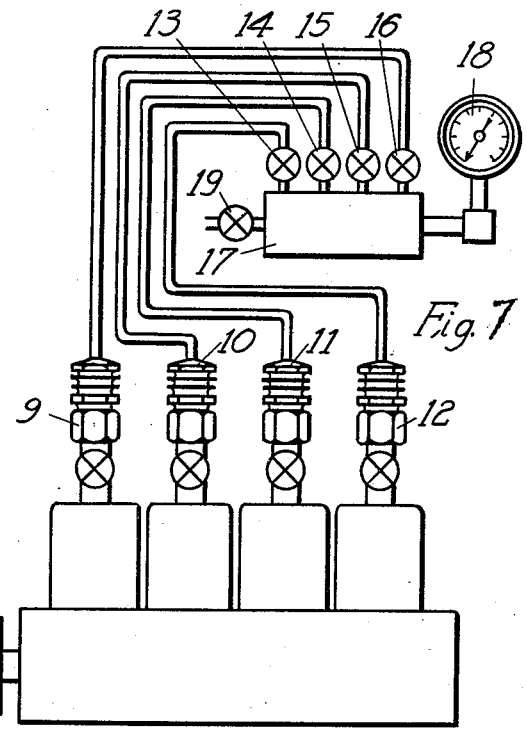
Fig. 7
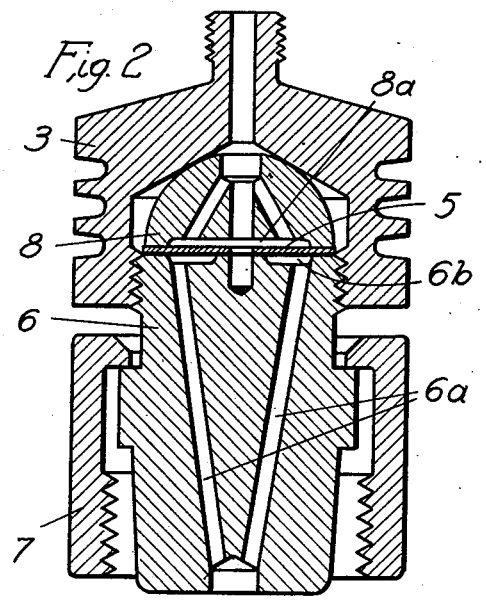
Fig. 2
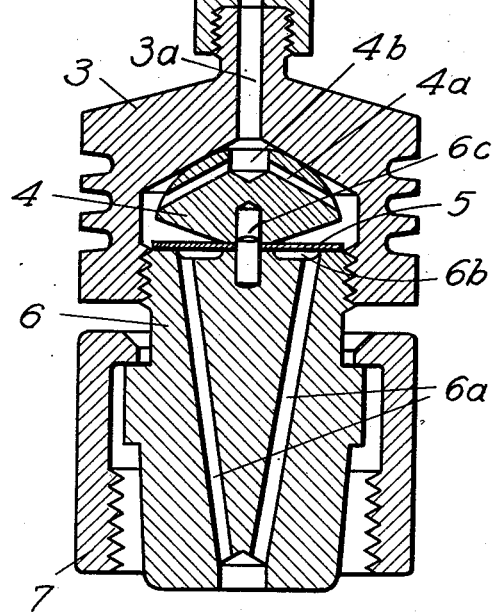
INVENTOR
Kalman John DeJuhasz April 3, 1951     K. J. DE JUHASZ     2,547,377
CHECK VALVE DEVICE
Filed Dec. 19, 1944     2 Sheets-Sheet 2
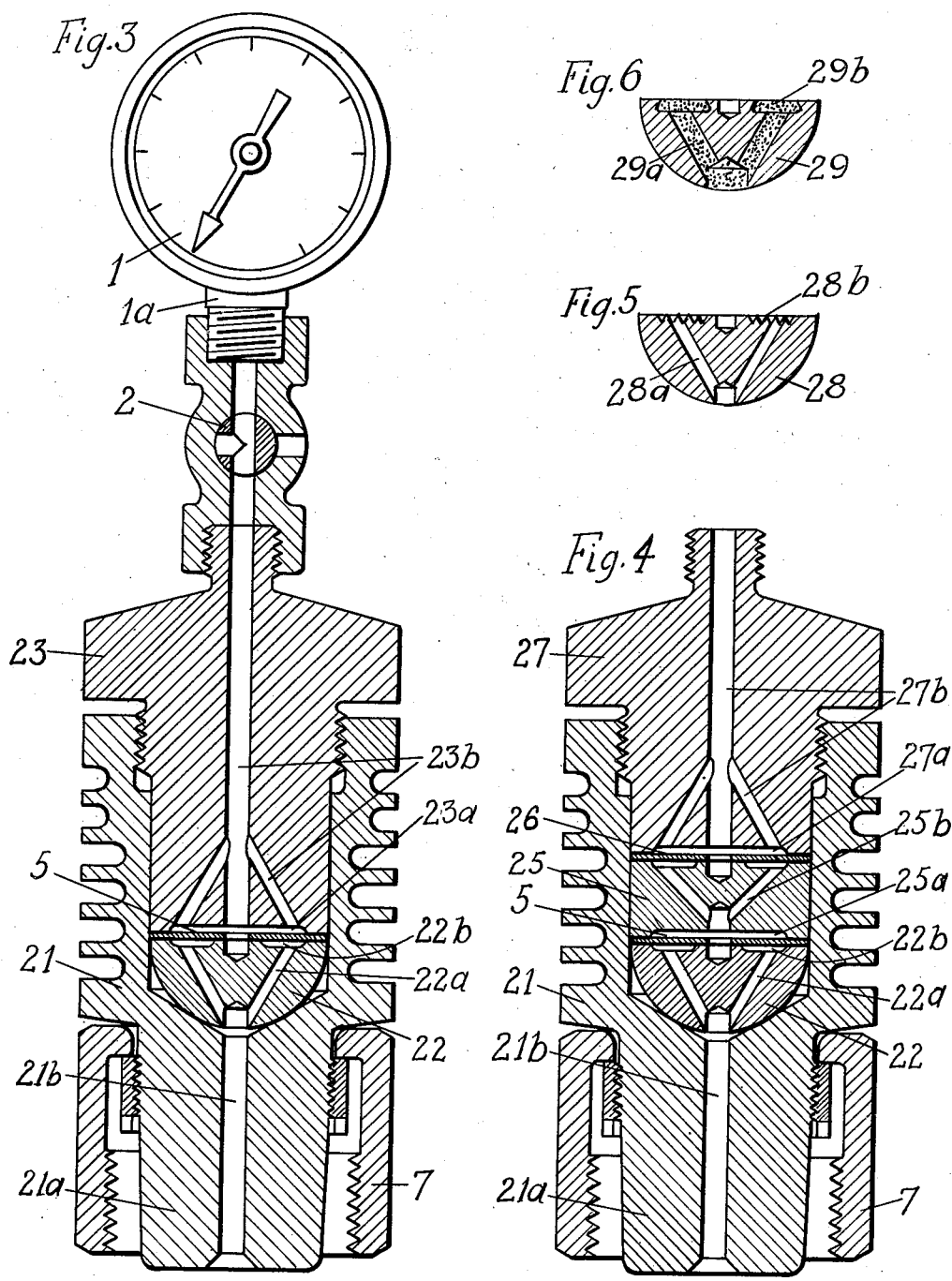
INVENTOR
Kalman John De Juhasz Patented Apr. 3, 1951

2,547,377

UNITED STATES PATENT OFFICE 2,547,377

CHECK VALVE DEVICE

Kalman John De Juhasz, State College, Pa.

Application December 19, 1944, Serial No. 568,842

3 Claims. (Cl. 251—119)

My invention relates to improvements in gauges for measuring the extreme value of a variable pressure, such as the maximum and minimum pressure occurring in the cylinder, intake pipe and exhaust pipe of a piston engine, pump, or compressor, in particular the maximum value of cyclically recurring compression and combustion pressures in the cylinders of internal combustion engines.

The maximum pressure in the cylinder of an internal combustion engine correlates with the loading of the cylinder. Equality of maximum pressures in the several cylinders of a multi-cylinder engine denotes equality of load in them; contrariwise, difference in the maximum pressure indicates inequality of loading, which may cause excessive stresses in some of the cylinders, and also unfavorable torsional stresses in the crankshaft. An excessively high maximum pressure signifies the presence of detonation which is a dangerous condition. For these reasons the maximum cylinder pressure is an important information relative to the functioning of the engine.

Several types of maximum pressure gauges have been developed in the past, one type of which incorporates between the engine cylinder and a normal type of pressure gauge a check valve allowing gases to pass through in only one direction, that is, out of the cylinder towards the pressure gauge. Then, in operation, the pressure gauge will show the maximum pressure occurring in the cylinder. After a reading has been taken the gases in the pressure gauge can be released through another valve, the release valve located between the check valve and the pressure gauge and a new reading can be taken. This being a simple device it lends itself to being applied to each cylinder of an engine in succession, or each engine cylinder may be fitted with an instrument permanently so that the operation of each can be constantly supervised.

For such an application the check valve should satisfy the following requirements:

(a) The moving mass of the valve and its displacement should be small. This is necessary because the maximum pressure persists in the engine cylinder for only a brief period, in high speed engines only for a few thousandths of a second, during which time the valve must be able to rise from its seat, let the gas pass through, and then to come to its seat again.

(b) The pressure difference which is needed to lift the valve from its seat must be as small as possible. It is well known that owing to the area of the seat the two sides of the valve present different areas to the gas pressure; hence, in order to lift the valve from its seat a greater pressure on the under side of the valve is needed than exists on the upper side. Owing to this characteristic the maximum pressure gauges incorporating check valves always show a smaller maximum pressure than actually occurs in the engine cylinder. While such a difference of indication is inevitably inherent in the principle yet it is desirable to keep it to the smallest practicable amount.

The essential element of my invention is a thin, flexible metal diaphragm capable of a small elastic deflection serving as a check valve whereby important improvements, mainly relative to requirements (a) and (b) are achieved; but my invention possesses also other advantages such as freedom from friction, small heat absorption, good heat radiation, simple construction and easy dismountability, as will be evident from the following description and illustrations.

Fig. 1 shows in sectional elevation one form of execution of the complete maximum pressure gauge.

Fig. 2 shows in sectional elevation another check valve assembly.

Fig. 3 shows in sectional elevation another embodiment of the check valve assembly having improved features.

Fig. 4 shows in sectional elevation another embodiment of the check valve having two diaphragm valves placed in series.

Fig. 5 shows a form of execution of the hemispherical clamping block.

Fig. 6 shows another form of execution of the hemispherical clamping block.

Fig. 7 shows the schematic arrangement of the instrument adapted to a multi-cylinder engine.

In the embodiment of my invention illustrated in Fig. 1 the pressure gauge 1 which may be of the Bourdon tube or diaphragm type is connected through the threaded shank 1a to the release valve 2 and this in turn to the check valve assembly comprising the finned hollow body 3, clamping block 4, diaphragm valve 5 and plug 6. This assembly is connected to the cylinder head, or other space of the engine to be tested by means of the tapered spigot portion of plug 6 and union nut 7. The hollow body 3 forms together with the screwed-in plug 6 a chamber which is connected with the pressure gauge by the outlet conduit 3a and with the engine space to be tested by the inlet conduit 6a, and in which chamber are enclosed the diaphragm valve 5 and clamping block 4. On the inside of the chamber and at the entrance of the inlet conduit, that is at the upper end surface of the plug 6 is formed a circular profiled area comprising an annular peripheral seat area and a central clamping area which two are preferably in the same plane and can be produced and reconditioned by lapping on a plane whetstone, and between these two areas an annular recess 6b in which the entrance of the inlet conduit is located. This circular profiled area is covered by the diaphragm valve 5. On the inside of the chamber and at the entrance of the outlet conduit is formed a beveled recess into which fits the clamping block 4. The clamping block 4 is of approximately hemispherical shape, part of it being bounded by a spherical surface adapted to fit into the beveled recess of the body 3 and to form with the latter virtually a spherical joint, and part of it is formed as a wide-angled truncated cone which in assembly lies next to the diaphragm valve 5 on its side opposite to the profiled circular area of plug 6. The plug 6 and diaphragm valve 5 are assembled together concentrically with the aid of the dowel pin 6c. When the plug 6 is screwed tight into the body 3 the diaphragm valve 5 is clamped firmly between the central clamping area of plug 6 and the clamping block 4 while the peripheral portion of the diaphragm valve 5 will seat on the annular peripheral seat area and cover the annular recess 6b. The wide-angled conical surface of block 4 serves as an abutment for limiting the lift of the peripheral portion of the diaphragm valve. The passages 4a and 4b formed in the block 4 communicate with the outlet conduit 3a and thereby permit the pressure medium passing by the peripheral edge of the diaphragm valve to enter into the outlet conduit 3a and hence into the pressure gauge 1. The spherical joint between the body 3 and the clamping block 4 ensures an even pressure and full contact between the two clamping areas and the central portion of the diaphragm valve 5.

In operation the diaphragm valve is exposed on its lower surface to the rapidly fluctuating engine pressure, and on its upper surface to the pressure existing in the pressure gauge. Whenever the force due to the engine pressures is greater than the force due to the gauge pressure the diaphragm valve lifts from its seat at its outer periphery and permits a small amount of gas to enter the pressure gauge whereby the pressure in the latter is increased. This process is repeated at every successive engine cycle until the two forces are equalized, after which no more lifting of the diaphragm valve will take place. Before a new reading is taken the gases accumulated in the pressure gauge 1 must be released by bringing the release valve 2 in communication with the atmosphere.

Equal forces acting on the two sides of the diaphragm valve 5 do not correspond to exactly equal pressures on account of the annular seat area of the disc valve. The discrepancy is the greater the larger is the seat area compared to the total exposed area of the valve. For this reason it is desirable to reduce the valve seat area relative to the total area.

This reduction can be accomplished by locating the valve seat at the central portion of the valve as it is illustrated in Fig. 2. In this embodiment of my invention the diaphragm valve 5 is provided with a central orifice and it is clamped at its outer periphery between the profiled surface of the plug 6 and the modified clamping block 8. In this embodiment the valve seat is located around the central portion of the profiled surface of the plug 6 while the lower surface of the clamping block 8 adjacent to the diaphragm valve 5 is provided with a lapped outer periphery for the purpose of clamping and a shallow recess 8a permitting the center portion of the diaphragm valve 5 to rise a few thousandths of an inch. Otherwise the function is the same as described in connection with Fig. 1. It is readily seen that, assuming a given seat width, the seat area in the peripherally clamped valve according to Fig. 2 is much smaller in proportion to the effective area than in the case of the centrally clamped valve according to Fig. 1. It will be realized that the diaphragm valve having a central orifice according to Fig. 2 provides only a small flow area for the passage of the gases from the inlet side to the outlet side. But for this particular purpose no large flow area is needed; in fact a small flow area has the advantage that violent fluctuations of pressure in the pressure gauge are avoided.

Fig. 3 shows another modification of the check valve assembly in which the finned body 21 is formed of one piece with the tapered spigot 21a whereby the heat conduction and dissipation is improved. The inside of the body 21 forms a hollow chamber having a beveled recess which communicates with the engine space by means of the inlet conduit 21b. The clamping block 22 is formed to an approximately hemispherical shape and its spherical surface fits into the beveled recess of body 21 forming therewith a spherical joint. The upper flat surface of the clamping block 22 is profiled to form a peripheral annular clamping area and a central seat area, and between these two areas the shallow annular recess 22b which communicates with the inlet conduit 21b through the bores 22a. The plug 23 is screwed into the hollow body 21 and is formed at its lower circular surface with a shallow recess 23a which latter communicates with the pressure gauge 1 by means of the drilled passage 23b. Between the upper surface of the clamping block 22 and the lower surface of the plug 23 is clamped the diaphragm 5 at its periphery while its central portion rests on the central seat area of the clamping block 22, and is permitted a few thousandths of an inch movement into the recess 23a of the plug 23. The clamping block 22 assumes a position such that its peripheral area is parallel with the peripheral clamping area of plug 23, hence the periphery of the diaphragm valve is clamped with an even pressure. Furthermore the diaphragm valve 5 is automatically centered within body 21 relative to the two clamping members.

Fig. 4 shows another modification of the check valve assembly showing two diaphragm valves 5 and 26 in series clamped between the lower clamping block 22, middle clamping block 25 and plug 27. The middle clamping block 25 is formed at its lower side with the shallow recess 25a and with passages 25b, and the plug 27 is formed at its lower side with the shallow recess 27a and with passages 27b. The other numerals in Fig. 4 denote similar elements as in the previous figures. This construction has the advantage of increased reliability of operation because the assembly will function even if one of the diaphragm valves should be damaged and become inoperative. Also more than two valves can be assembled in series in one check valve assembly.

A disadvantage of the previously described clamping blocks such as 22 and 25 is that the diaphragm may be pressed in the annular recess 22b by the pressure of the gases acting on the upper surface of the diaphragm, and thereby suffer a permanent deformation or denting, which is detrimental to its function as a check valve. Fig. 5 shows a clamping block 28 in which this disadvantage is mitigated by the annular recess 28b being constructed with ridges which provide a support for the diaphragm and yet allow the engine gases to reach the underside of the diaphragm through the passages 28a.

Another means of accomplishing the same effect is shown in Fig. 6 in which the clamping block 29 is provided with passages 29a and an annular recess 29b, in a manner similar to the previously shown examples of the clamping block, but the passages 29a and the annular recess 29b are filled with a porous and permeable, yet mechanically strong material such as the Porex material manufactured by the Moraine Products Division of General Motors Corporation.

It will be seen that the check valve assembly according to my invention has the advantages of freedom from friction because the motion of the valve is in the elastic range, of simple construction, and of easy dismountability and cleaning in virtue of the fewness of parts.

For some purposes the determination of the minimum value of a fluctuating pressure is of interest. The described forms of check valve can be adapted for such purpose by connecting the assembly in the reverse manner, that is, the inlet conduit to the pressure gauge and the outlet conduit to the source of fluctuating pressure.

If the release valve 2 is left continuously slightly open, or if a special small leak opening is provided then the pressure gauge 1 will continually show the maximum pressure, even if it is somewhat variable, without the necessity of opening and closing the release valve 2 for the purpose of taking a new reading.

If the check valve assemblies alone are mounted on the engine cylinders and connected by tubings to a corresponding number of pressure gauges arranged near the operating platform of the engine then such installation enhances the convenience of supervising the performance of the engine. Fig. 7 shows a modification of this scheme. In this a four cylinder engine is shown schematically, each cylinder being fitted with a check valve assembly 9, 10, 11 and 12, which are connected through valves 13, 14, 15 and 16 to the common manifold block 17. This latter is fitted with one pressure gauge 18 and one release valve 19. Thus the reading for all engine cylinders is taken on the same pressure gauge.

The described constructions are illustrative only and do not limit the scope of my invention which is defined by the following claims.

I claim:

1. A check valve for use between a pressure gauge and a source of variable pressure comprising a hollow body having a chamber formed therein with an inlet passage leading to, and an outlet passage leading from, said chamber, one of said passages being adapted for connection to a variable pressure and the other of said passages being adapted for connection to a pressure gauge, a portion of the wall at the bottom of said chamber being formed as a beveled recess, a block of approximately hemispherical shape adjoining with its spherical surface to said beveled recess and having its flat circular surface profiled to form an annular peripheral clamping area and a central seat area and between these two areas an annular recess, a passage in said block connecting said annular recess with said inlet passage, a diaphragm valve member having a central orifice, means clamping the peripheral portion of said diaphragm valve member to said peripheral clamping area, and an abutment in said chamber to limit the deflection of the central portion of said diaphragm valve member.

2. A check valve for use between a pressure gauge and a source of variable pressure comprising a hollow body having a chamber formed therein with an inlet passage leading to, and an outlet passage leading from, said chamber, one of said passages being adapted for connection to a variable pressure and the other of said passages being adapted for connection to a pressure gauge, a portion of the wall at the bottom of said chamber being formed as a beveled recess, a block of approximately hemispherical shape adjoining with its spherical surface to said beveled recess and having its flat circular surface profiled to form an annular peripheral clamping area and a central seat area and between these two areas an annular recess, said annular recess being constructed with ridges, a passage in said block connecting said annular recess with said inlet passage, a diaphragm valve member having a central orifice, means clamping the peripheral portion of said diaphragm valve member to said peripheral clamping area, and an abutment in said chamber to limit the deflection of the central portion of said diaphragm valve member.

3. A check valve for use between a pressure gauge and a source of variable pressure comprising a hollow body having a chamber formed therein with an inlet passage leading to, and an outlet passage leading from, said chamber, one of said passages being adapted for connection to a variable pressure and the other of said passages being adapted for connection to a pressure gauge, a portion of the wall at the bottom of said chamber being formed as a beveled recess, a block of approximately hemispherical shape adjoining with its spherical surface to said beveled recess and having its flat circular surface profiled to form an annular peripheral clamping area and a central seat area and between these two areas an annular recess, said annular recess being filled with porous material for transmitting said variable pressure, a passage in said block connecting said annular recess with said inlet passage, a diaphragm valve member having a central orifice, means clamping the peripheral portion of said diaphragm valve member to said peripheral clamping area, and an abutment in said chamber to limit the deflection of the central portion of said diaphragm valve member.

KALMAN JOHN DE JUHASZ.

REFERENCES CITED

The following references are of record in the file of this patent:

UNITED STATES PATENTS

| Number | Name | Date |
|---|---|---|
| 178,253 | Stacy | June 6, 1876 |
| 213,118 | Locke | Mar. 11, 1879 |
| 236,719 | Renton | Jan. 18, 1881 |
| 486,501 | Phillippi | Nov. 22, 1892 |
| 1,121,105 | Karlson | Dec. 15, 1914 |
| 1,424,461 | Frankforter | Aug. 1, 1922 |
| 1,462,109 | Hopkins | July 17, 1923 |
| 2,015,915 | Adsit | Oct. 1, 1935 |
| 2,214,364 | Edwards | Sept. 10, 1940 |
| 2,280,411 | Kiene | Apr. 21, 1942 |
| 2,371,891 | Hoffmann | Mar. 20, 1945 |